(12) United States Patent
Ikegawa et al.

(10) Patent No.: US 9,735,662 B2
(45) Date of Patent: Aug. 15, 2017

(54) INSULATION COMMUNICATION DEVICE

(71) Applicant: DENSO CORPORATION, Kariya, Aichi-pref. (JP)

(72) Inventors: Kohei Ikegawa, Kariya (JP); Shuntaro Okada, Kariya (JP); Takeshi Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/112,443

(22) PCT Filed: Dec. 26, 2014

(86) PCT No.: PCT/JP2014/006482
§ 371 (c)(1),
(2) Date: Jul. 19, 2016

(87) PCT Pub. No.: WO2015/111124
PCT Pub. Date: Jul. 30, 2015

(65) Prior Publication Data
US 2016/0336844 A1 Nov. 17, 2016

(30) Foreign Application Priority Data
Jan. 23, 2014 (JP) .................................. 2014-010381

(51) Int. Cl.
*H02M 1/00* (2006.01)
*H02M 3/335* (2006.01)
(Continued)

(52) U.S. Cl.
CPC ............... *H02M 1/00* (2013.01); *H02M 1/44* (2013.01); *H02M 3/33569* (2013.01); *H04B 5/005* (2013.01); *H04B 5/0031* (2013.01); *H04B 5/0081* (2013.01); *H04L 25/02* (2013.01); *H02M 2001/0009* (2013.01)

(58) Field of Classification Search
CPC ... H02M 1/00; H02M 1/44; H02M 2001/0009
See application file for complete search history.

(56) References Cited

U.S. PATENT DOCUMENTS

2005/0057277 A1* 3/2005 Chen .................. H01F 17/0006
326/82
2010/0277090 A1* 11/2010 Fukumoto ......... H02M 7/53871
315/291
(Continued)

FOREIGN PATENT DOCUMENTS

JP 2007-036497 2/2007
JP 2011-146934 A 7/2011

*Primary Examiner* — Matthew Nguyen
*Assistant Examiner* — Yusef Ahmed
(74) *Attorney, Agent, or Firm* — Posz Law Group, PLC

(57) ABSTRACT

An insulation communication device includes a transmission circuit having a primary coil; and a reception circuit including a secondary coil, and is configured to transmit a signal from the transmission circuit to the reception circuit by magnetic coupling between the primary coil and the secondary coil. The transmission circuit includes an edge detection circuit, a bridge circuit, a coil current information detection circuit, and a pulse signal control circuit. The reception circuit includes a first detection circuit, a second detection circuit and an output signal generation circuit.

4 Claims, 13 Drawing Sheets

(51) Int. Cl.
     H04B 5/00      (2006.01)
     H04L 25/02     (2006.01)
     H02M 1/44      (2007.01)

(56) References Cited

U.S. PATENT DOCUMENTS

| | | | | |
|---|---|---|---|---|
| 2011/0291702 | A1* | 12/2011 | Kaeriyama | H04L 7/0008 |
| | | | | 326/62 |
| 2012/0212270 | A1* | 8/2012 | Ishimatsu | H03K 17/0822 |
| | | | | 327/198 |
| 2012/0250385 | A1* | 10/2012 | Takihara | H02M 1/32 |
| | | | | 363/132 |
| 2012/0319743 | A1* | 12/2012 | Morishita | H04L 25/0276 |
| | | | | 327/110 |
| 2013/0055052 | A1* | 2/2013 | Kaeriyama | H01L 25/162 |
| | | | | 714/799 |
| 2013/0259144 | A1* | 10/2013 | Takeda | H04L 25/026 |
| | | | | 375/258 |
| 2013/0287141 | A1* | 10/2013 | Kaeriyama | H04L 1/0041 |
| | | | | 375/296 |
| 2015/0248966 | A1* | 9/2015 | Morokuma | H03K 5/1534 |
| | | | | 375/259 |
| 2016/0056850 | A1* | 2/2016 | Nagase | H03K 5/04 |
| | | | | 375/340 |
| 2016/0241151 | A1* | 8/2016 | Wakabayashi | H02M 3/33592 |
| 2016/0277043 | A1* | 9/2016 | Takeda | H04B 1/40 |

* cited by examiner

| DIN | RCMPEN | FCMPEN | DINA |
|---|---|---|---|
| 0 | 0 | 0 | 0 |
| 0 | 0 | 1 | 0 |
| 0 | 1 | 0 | 1 |
| 0 | 1 | 1 | 0 |
| 1 | 0 | 0 | 1 |
| 1 | 0 | 1 | 0 |
| 1 | 1 | 0 | 1 |
| 1 | 1 | 1 | 1 | ns
INSULATION COMMUNICATION DEVICE

CROSS REFERENCE TO RELATED APPLICATION

This application is a U.S. national stage of International Application No. PCT/JP2014/006482 filed on Dec. 26, 2014 and is based on Japanese Patent Application No. 2014-10381 filed on Jan. 23, 2014, the disclosures of which incorporated herein by reference.

TECHNICAL FIELD

The present disclosure relates to an insulation communication device that transmits signals from a transmission circuit to a reception circuit by magnetic coupling between a primary coil and a secondary coil.

BACKGROUND ART

Isolated communication technology that uses magnetic couplers has received attention because of its advantages such as higher speed, lower power consumption, and smaller circuit scale as compared to photo couplers. In the insulation communication technology, it is a common technique to detect a rising edge and a falling edge of an input signal and to transfer the edge detection signal from the primary side to the secondary side of a transformer coil.

With earlier techniques, detection signals of a rising edge and a failing edge have been transferred using different transformer coils, resulting in the difficulty of increased circuit scale because of the necessity to provide two sets of transformer coils. This difficulty can be solved by generating an edge detection signal having different waveforms for the rising and falling edges of an input signal and transferring the generated edge detection signal to a secondary side. Thus, the edge detection signal can be transferred using a set of transformer coils.

In methods that have been proposed so far, for example, two short consecutive pulses are generated by a detection of a rising edge, and one short pulse is generated by a detection of a falling edge, or, a long pulse is generated by a detection of a rising edge, and a short pulse is generated by a detection of a falling edge. With these methods, however, a certain time is required for a logic circuit provided on the secondary side to distinguish a rising edge from a falling edge, resulting in an increase of the delay time from an edge change in the input signal until an edge change in the output signal. Also, when the duty ratio of the input signal is increased or decreased so that short-width pulses (hereinafter, "short pulses") are generated, errors may occur.

A method developed in recent years has enabled transfer of an edge detection signal with a set of transformer coils by causing a current to flow through the coils in opposite directions for the rising and falling of an input signal (see Patent Literature 1). When the current increases in the positive direction in accordance with the rising of the input signal, a positive voltage is generated in the secondary coil. When the current decreases toward zero afterwards, a negative voltage is generated in the secondary coil.

The positive voltage provides the required edge detection signal, while the negative voltage is unwanted noise. At the falling of the input signal, a negative voltage which is the edge detection signal and a positive voltage which is noise are generated in the secondary coil. To negate the noise, a non-detection period is provided for the secondary side circuit. However, when short pulses appear in the input signal, the next edge detection signal will be included in the non-detection period, because of which this edge detection signal is made invalid and a detection failure may occur.

In another configuration that has been proposed, while it adopts the method of using a current flowing through the coils in opposite directions for the rising and falling edges of the input signal, the gradient of the decreasing coil current is made smaller than the gradient of the increasing coil current (see Patent Literature 2). According to this method, the noise component generated in the secondary coil is reduced, so that the necessity of the non-detection period is eliminated.

In the configuration described in Patent Literature 2, an H bridge is used to flow a current through the primary coil. When short pulses appear in the input signal, the input signal may fall during the decrease of the coil current started to increase in response to the rising of the input signal, which may cause arm short-circuiting of the H bridge. Patent Literature 2 does not mention the timing of switching the standby switch that forms the lower arm of the H bridge. If the standby switch is turned off during the decrease of the coil current (if the switching timing is too early), an oscillatory noise may be generated on the secondary side, which may lead to generation of a wrong output signal. On the other hand, if the switching timing is too late, errors may occur when short pulses appear in the input signal.

PRIOR ART LITERATURES

Patent Literature

Patent Literature 1: JP2007-036497A
Patent Literature 2: JP2011-146934A

SUMMARY OF INVENTION

It is an object of the present disclosure to provide an insulation communication device wherein noise generated on a secondary side is reduced to prevent errors in an output signal, and arm short-circuiting is prevented even when short pulses appear in the input signal, so that the signal can be correctly transferred.

An insulation communication device according to an aspect of the present disclosure includes a transmission circuit including a primary coil and a reception circuit including a secondary coil. The insulation communication device transmits a signal from the transmission circuit to the reception circuit by magnetic coupling between the primary coil and the secondary coil. The transmission circuit includes an edge detection circuit, a bridge circuit, a coil current information detection circuit, a standby signal control circuit, and a pulse signal control circuit. The reception circuit includes a first detection circuit, a second detection circuit and an output signal generation circuit.

The an edge detection circuit that generates a first pulse signal when detecting a falling edge of an input signal and generates a second pulse signal when detecting a rising edge of the input signal. The bridge circuit includes: a first arm in which a first main switch driven to turn on based on the first pulse signal and a first standby switch driven to turn on based on a first standby signal are connected in series via a first output terminal; and a second arm in which a second main switch driven to turn on based on the second pulse signal and a second standby switch driven to turn on based on a second standby signal are connected in series via a second output terminal. The bridge circuit is connected to the primary coil, which is arranged between the first output terminal and the second output terminal.

The coil current information detection circuit detects a current flowing through the primary coil. The standby signal control circuit switches the first standby signal to an on state in place of the second standby signal when the increased current detected by the coil current information detection circuit returns to zero after the edge detection circuit has output the first pulse signal. Additionally, the standby signal control circuit switches the second standby signal to an on state in place of the first standby signal when the increased current, which has detected, returns to zero after the edge detection circuit has output the second pulse signal.

The pulse signal control circuit that restricts the edge detection circuit from generating the second pulse signal during a period of time until the increased current detected by the coil current information detection circuit returns to zero after the edge detection circuit has output the first pulse signal, and restricts the edge detection circuit from generating the first pulse signal during a period of time until the increased current detected by the coil current information detection circuit returns to zero after the edge detection circuit outputs the second pulse signal.

The first detection circuit detects a positive voltage generated in the secondary coil; the second detection circuit detects a negative voltage generated in the secondary coil; and an output signal generation circuit shifts the output voltage to a first level based on the detected positive voltage, and shifts the output voltage to a second level based on the detected negative voltage In the standby signal control circuit, after the edge detection circuit outputs a pulse signal in accordance with the detection of an edge of the input signal, the standby signal is switched in a minimum time while an oscillatory noise that can be generated on the secondary side is minimized. With this configuration, errors in the output signal caused by noise and arm short-circuiting in the bridge circuit can be prevented. In the pulse signal control circuit, even when short pulses appear in the input signal, the interval of pulse signals is broadened appropriately, so that arm short-circuiting in the bridge circuit is prevented, and the input signal is correctly transferred.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1A:
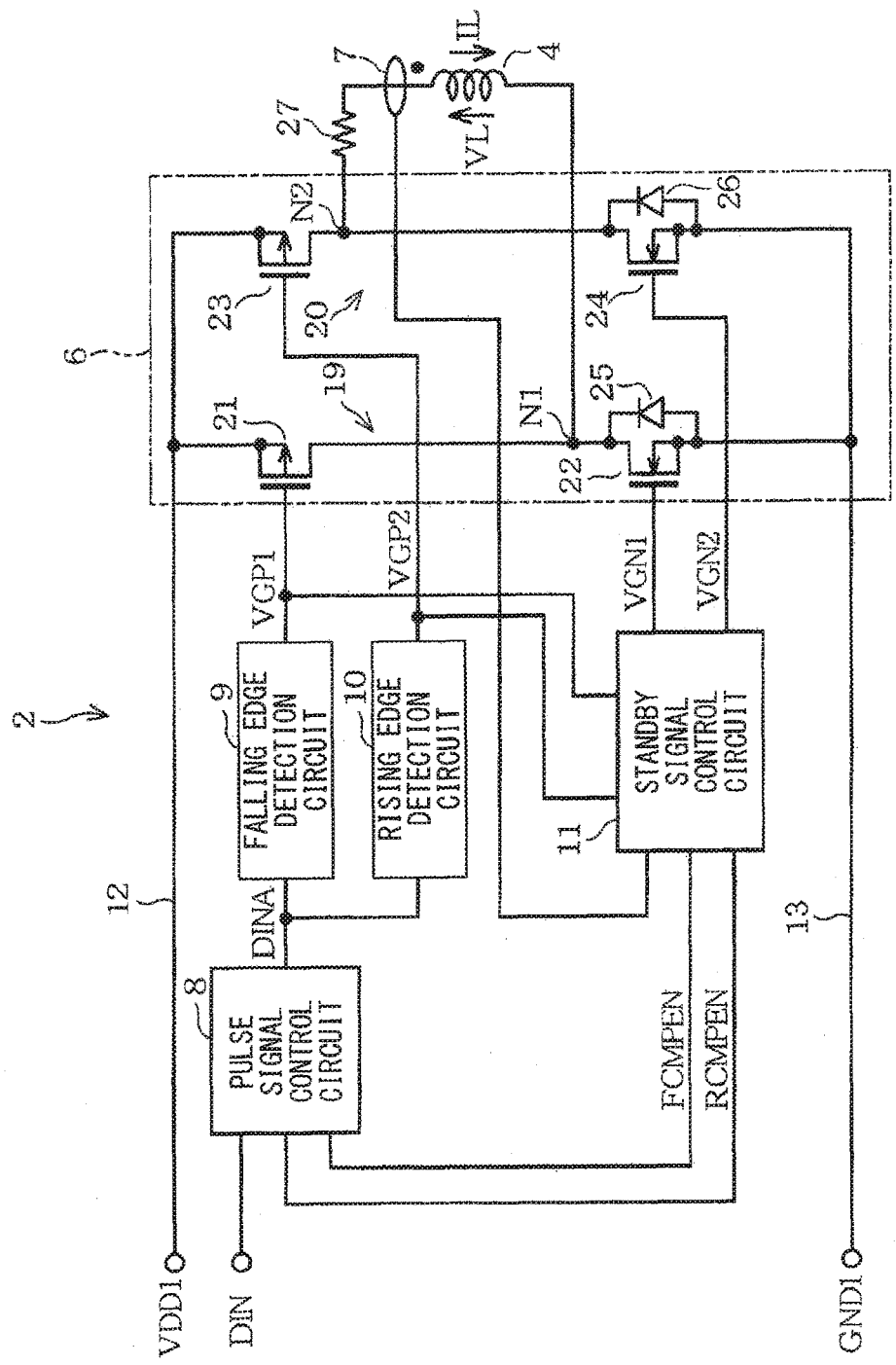
FIG. 1A is a schematic configuration diagram illustrating a transmission circuit of an insulation communication device according to one embodiment of the present disclosure.
Figure 1B:
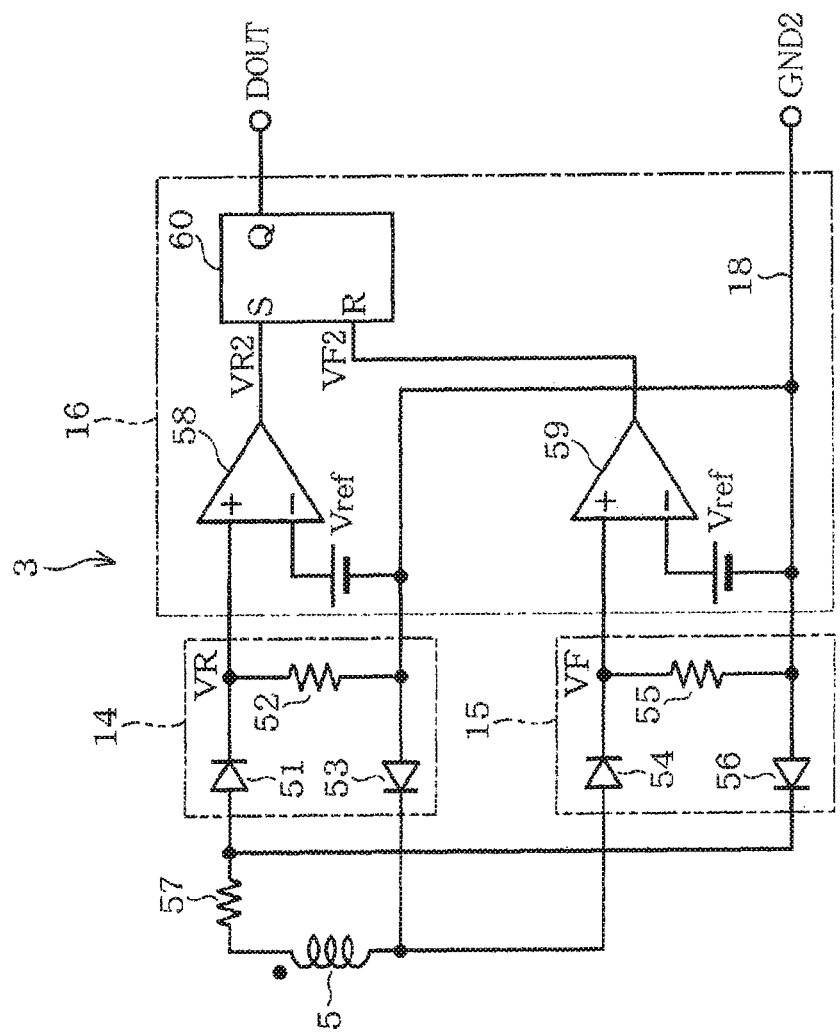
FIG. 1B is a schematic configuration diagram illustrating a reception circuit of the insulation communication device.
Figure 2:
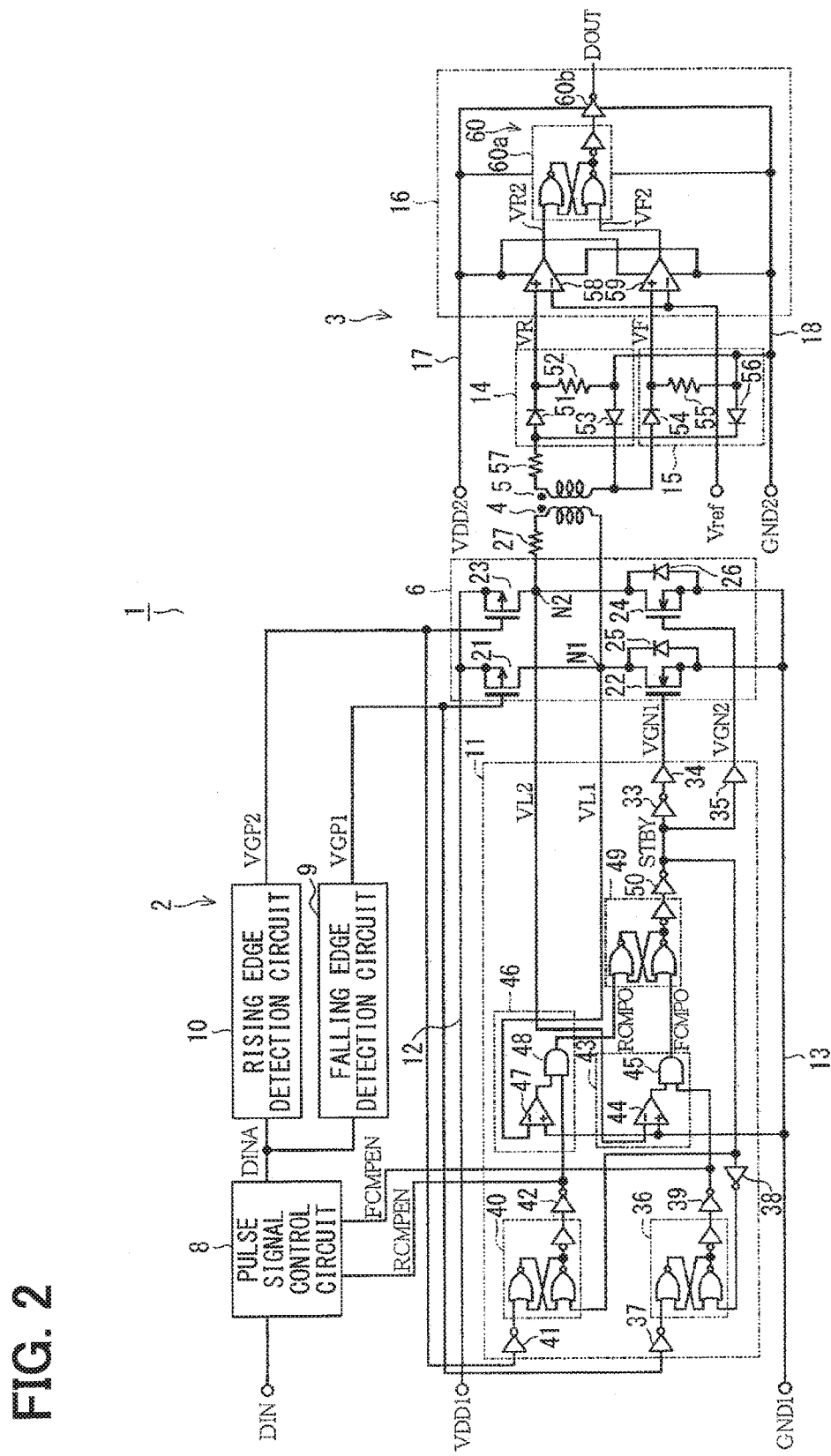
FIG. 2 is a detailed configuration diagram of the insulation communication device.

One embodiment of the present disclosure will be described with reference to the drawings. FIG. 1A and FIG. 1B respectively illustrate schematic configurations of a transmission circuit 2 and a reception circuit 3 of an insulation communication device 1. FIG. 2 illustrates a detailed circuit configuration of the insulation communication device 1. Constituent elements corresponding to each other in FIG. 1A, FIG. 1B, and FIG. 2 are denoted with the same reference signs.

The transmission circuit 2 and the reception circuit 3 of the insulation communication device 1 include a primary coil 4 and a secondary coil 5, respectively. The primary coil 4 and the secondary coil 5 are magnetically coupled, so that an input signal DIN of the transmission circuit 2 is transferred from the primary side to the secondary side, to be output as an output signal DOUT from the reception circuit 3. The insulation communication device 1 that uses such a magnetic coupler offers higher speed, lower power consumption, and smaller circuit scale as compared to an insulation communication device that uses a photo coupler.

The transmission circuit 2 includes a bridge circuit 6, a coil current information detection circuit 7, a pulse signal control circuit 8, a falling edge detection circuit 9 (hereinafter referred to as "edge detection circuit 9"), a rising edge detection circuit 10 (hereinafter referred to as "edge detection circuit 10"), and a standby signal control circuit 11. The transmission circuit 2 is operated with a power supply voltage VDD1 (of, for example, 5 V) applied across power supply lines 12 and 13.

The reception circuit 3 includes a first detection circuit 14, a second detection circuit 15, and an output signal generation circuit 16. The reception circuit 3 is operated with a power supply voltage VDD2 (of, for example, 5 V) applied across power supply lines 17 and 18. In the description below, an "H level" refers to a level having a potential of VDD1 or VDD2, and an "L level" refers to a level having a ground potential (GND1, GND2), which is 0 V.

The bridge circuit 6 includes two arms 19 and 20 connected between the power supply lines 12 and 13. The arm 19 includes a P-channel MOS transistor 21 and an N-channel MOS transistor 22 connected in series via a first output terminal N1. The arm 20 includes a P-channel MOS transistor 23 and an N-channel MOS transistor 24 connected in series via a second output terminal N2. Reflux diodes 25 and 26 with illustrated polarities are respectively connected in parallel to the transistors 22 and 24. The primary coil 4 is connected between the output terminals N1 and N2. A resistor 27 is connected in series to the primary coil 4. The arm 19 corresponds to a first arm while the arm 20 corresponds to a second arm.

The transistor 21 corresponds to a first main switch and is driven to turn on by a first pulse signal VGP1. The transistor 23 corresponds to a second main switch and is driven to turn on by a second pulse signal VGP2. The transistor 22 corresponds to a first standby switch and is driven to turn on by a first standby signal VGN1. The transistor 24 corresponds to a second standby switch and is driven to turn on by a second standby signal VGN2.

The coil current information detection circuit 7 detects a current IL flowing through the primary coil 4. In the coil current information detection circuit 7, the current flows in a positive direction from the output terminal N2 toward the output terminal N1. The pulse signal control circuit 8 outputs an input signal DINA, which maintains the level of the input signal DIN for a period of time in which a detected current returns to zero after having increased in a negative direction or the positive direction at the falling or rising of the input signal DIN.

Figures 3, 4:
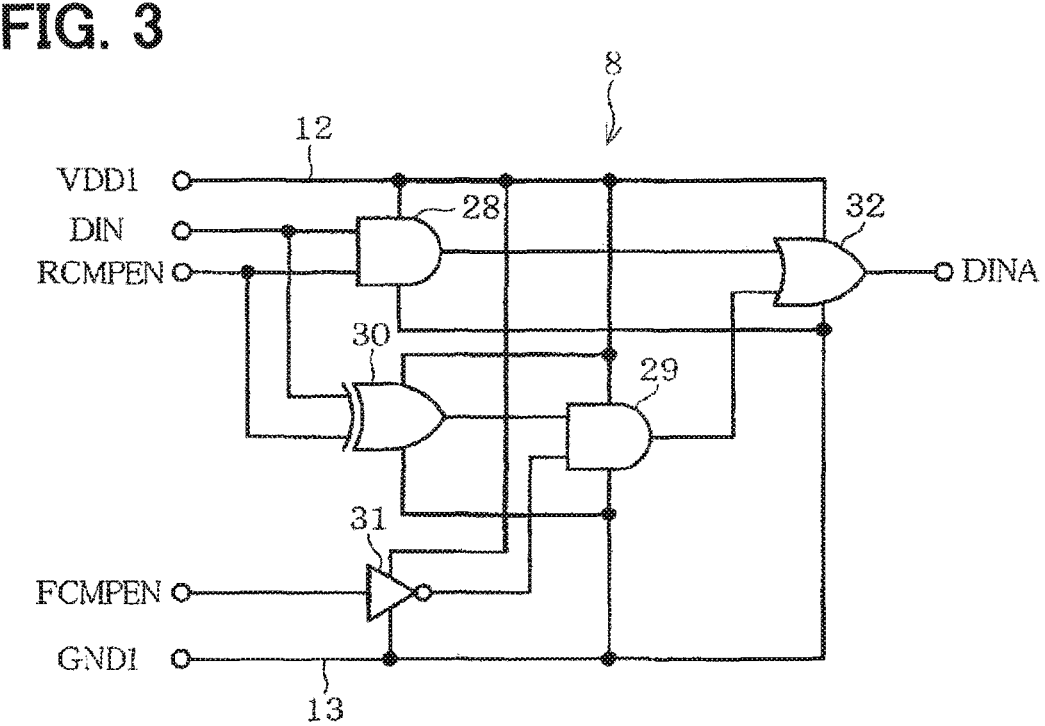
FIG. 3 is a configuration diagram of a pulse signal control circuit.
FIG. 4 is a diagram showing truth values that indicate the operation of the pulse signal control circuit.
Figure 5:
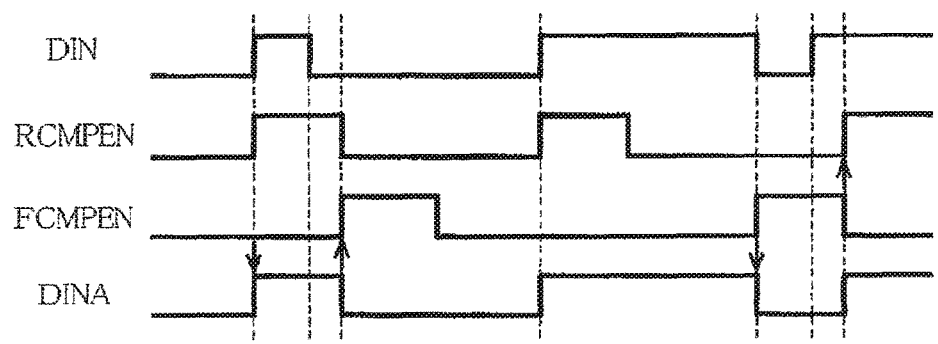
FIG. 5 is a timing chart that shows the operation of the pulse signal control circuit.

The pulse signal control circuit 8 is formed of a logic circuit including AND circuits 28 and 29, an ExOR circuit 30, an inverter 31, and an OR circuit 32, as shown in FIG. 3. Signals FCMPEN and RCMPEN are generated by the standby signal control circuit 11. The Signal FCMPEN stays at the H level for a period of time in which a detected current returns to zero after having increased in the negative direction from the falling edge of the input signal DIN. The signal RCMPEN stays at the H level for a period of time in which a detected current returns to zero after having increased in the positive direction from the rising edge of the input signal DIN. FIG. 4 shows a truth table that illustrates the operations of the pulse signal control circuit 8, and FIG. 5 shows the waveforms.

The edge detection circuit 9 detects the falling edge of the input signal DINA and generates a first pulse signal VGP1 that stays at the L level for a predetermined width. The edge detection circuit 10 detects the rising edge of the input signal DINA and generates a second pulse signal VGP2 that stays at the L level for a predetermined width. The predetermined width is set to be a time width that is necessary and satisfactory for generating a voltage having an appropriate amplitude corresponding to the edges of the input signal DINA in the secondary coil 5 by causing a current to flow through the primary coil 4.

The standby signal control circuit 11 inputs the signals FCMPEN and RCMPEN and the detected current, and generates a standby signal STBY and, in turn, a first standby signal VGN1 and a second standby signal VGN2. The standby signal STBY becomes the first standby signal VGN1 via an inverter 33 and a buffer 34 and also becomes the second standby signal VGN2 via an inverter 35, as shown in FIG. 2. The coil current information detection circuit 7 in the circuit shown in FIG. 2 uses the on-resistance of the transistors 22 and 24.

In a latch circuit 36, the first pulse signal VGP1 is input to a set input terminal (5) via an inverter 37 and the standby signal STBY is input to a reset input terminal (R) via an inverter 38. An output signal from the latch circuit 36 becomes the signal FCMPEN through an inverter 39.

With this configuration, when the first pulse signal VGP1 falls to the L level while the standby signal STBY is at the H level, the signal FCMPEN rises to the H level. When the first pulse signal VGP1 returns to the H level while the standby signal STBY is at the H level, the signal FCMPEN is kept at the H level. When the standby signal STBY falls to the L level while the first pulse signal VGP1 is at the H level, the signal FCMPEN falls to the L level.

In a latch circuit 40, the second pulse signal VGP2 is input to a set input terminal (S) via an inverter 41 and the standby signal STBY is directly input to a reset input terminal (R). An output signal from the latch circuit 40 becomes the signal RCMPEN through an inverter 42.

With this configuration, when the second pulse signal VGP2 falls to the L level while the standby signal STBY is at the L level, the signal RCMPEN rises to the H level. When the second pulse signal VGP2 returns to the H level while the standby signal STBY is at the L level, the signal RCMPEN is kept at the H level. When the standby signal STBY rises to the H level while the second pulse signal VGP2 is at the H level, the signal RCMPEN falls to the L level.

A comparator 43 with an enable input includes a comparator 44 and an AND circuit 45 that gates an output signal from the comparator 44 with the signal FCMPEN. The comparator 44 compares the voltage VL2 at the output terminal N2 of the bridge circuit 6 with the ground potential. As a result, the comparator 44 outputs an L-level signal when a current flows through the transistor 24 and the drain-source voltage becomes positive. On the other hand, the comparator 44 outputs an H-level signal when no current flows through the transistor 24 and the drain-source voltage is 0 V. In other words, the comparator 43 with the enable input outputs an H-level signal FCMP0 when the signal FCMPEN, which is a gate signal, is at the H level and no current flows through the transistor 24.

A comparator 46 with an enable input includes a comparator 47 and an AND circuit 48 that gates an output signal from the comparator 47 with the signal RCMPEN. The comparator 47 compares the voltage VL1 at the output terminal N1 of the bridge circuit 6 with the ground potential. As a result, the comparator 47 outputs an L-level signal when a current flows through the transistor 22 and the drain-source voltage becomes positive. On the other hand, the comparator 47 outputs an H-level signal when no current flows through the transistor 22 and the drain-source voltage is 0 V. In other words, the comparator 46 with the enable input outputs an H-level signal RCMP0 when the signal RCMPEN, which is a gate signal, is at the H level and no current flows through the transistor 22.

In a latch circuit 49, a signal RCMP0 is input to a set input terminal (S) and a signal FCMP0 is input to a reset input terminal (R). An output signal from the latch circuit 19 becomes the standby signal STBY through an inverter 50. With this configuration, when the signal FCMP0 rises to the H level, the standby signal STBY falls to the L level. On the other hand, when the signal RCMP0 rises to the H level, the standby signal STBY rises to the H level.

Next, the reception circuit 3 will be described. The first detection circuit 14 detects a positive voltage generated in the secondary coil 5 and is formed of a series circuit of a forward diode 51, a resistor 52, and a forward diode 53 connected between one end and the other end of the secondary coil 5. A node between the resistor 52 and the diode 53 is connected to the power supply line 18. When a positive voltage is generated in the secondary coil 5, a voltage VR is generated in the resistor 52.

The second detection circuit 15 detects a negative voltage generated in the secondary coil 5 and is formed of a series circuit of a forward diode 54, a resistor 55, and a forward diode 56 connected between one end and the other end of the secondary coil 5. A node between the resistor 55 and the diode 56 is connected to the power supply line 18. When a negative voltage is generated in the secondary coil 5, a voltage VF is generated in the resistor 55. A resistor 57 is connected in series to the secondary coil 5.

The output signal generation circuit 16 causes a transition of the output signal Dour to the H level (first level) with the detected positive voltage and also causes a transition of the output signal DOUT to the L level (second level) with the detected negative voltage. More specifically, the output signal generation circuit 16 includes a comparator 58 that compares the voltage VR with a reference voltage Vref and outputs a set signal VR2, a comparator 59 that compares the voltage VF with the reference voltage Vref and outputs a reset signal VF2, and an RS latch circuit 60 (latch circuit 60a and inverter 60b).

With this configuration, the output signal generation circuit 16 causes a transition of the output signal DOUT to the H level on condition that the voltage VR corresponding to the detected positive voltage is higher than the reference voltage Vref. Also, the output signal generation circuit 16 causes a transition of the output signal DOUT to the L level on condition that the voltage VF corresponding to the detected negative voltage is higher than the reference voltage Vref.

Next, the functions and effects of this embodiment will be described with reference also to FIG. 6 to FIG. 11B. The pulse signal control circuit 8 forbids the edge detection circuit 10 from generating the L-level second pulse signal VGP2 during a period until the detected current increased in the negative direction returns to zero after the edge detection circuit 9 has output the L-level first pulse signal VGP1. Similarly, the pulse signal control circuit 8 forbids the edge detection circuit 9 from generating the L-level first pulse signal VGP1 during until the detected current increased in the positive direction returns to zero after the edge detection circuit 10 has output the L-level second pulse signal VGP2.

The standby signal control circuit 11 switches the standby signal STBY to the L level when the detected current increased in the negative direction returns to zero after the edge detection circuit 9 has output the L-level first pulse signal VGP1. In other words, the standby signal control circuit 11 switches the second standby signal VGN2 to the L level (turn-off state) and switches the first standby signal VGN1 to the H level (turn-on state). Similarly, the standby signal control circuit 11 switches the standby signal STBY to the H level when the detected current increased in the positive direction returns to zero after the edge detection circuit 10 has output the L-level second pulse signal VGP2. In other words, the standby signal control circuit 11 switches the first standby signal VGN1 to the L level and switches the second standby signal VGN2 to the H level.

Figure 6:
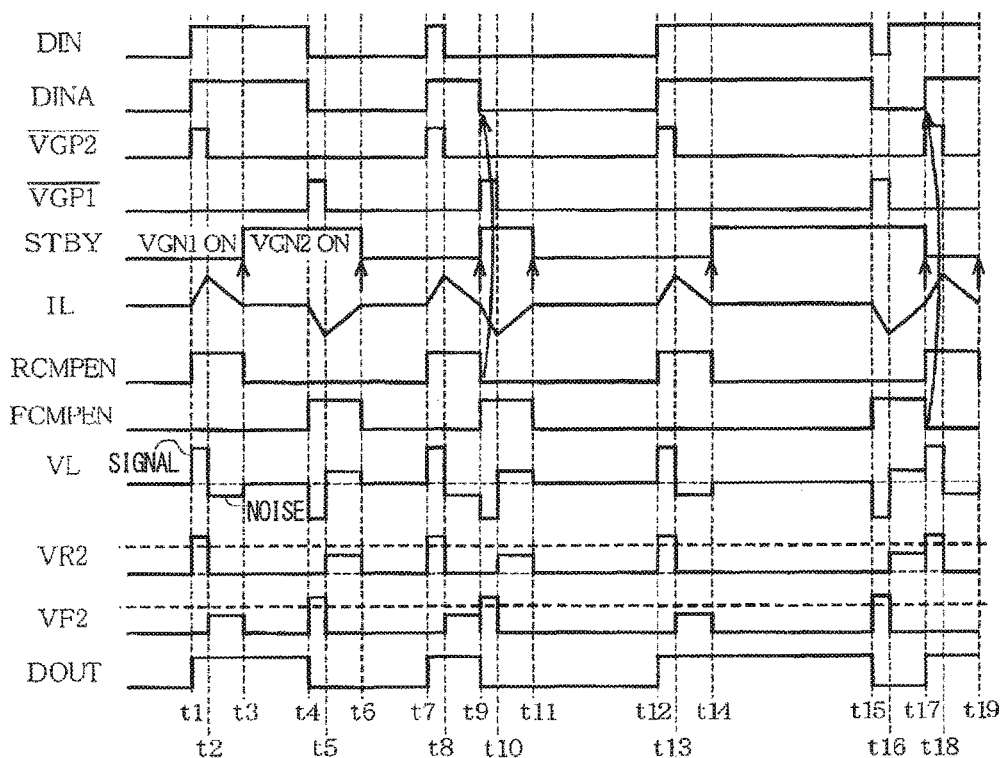
FIG. 6 is a waveform chart used for describing the operation.

FIG. 6 shows, from the top, the waveforms of the input signal DIN, the input signal DINA, an inverted signal of the second pulse signal VGP2, an inverted signal of the first pulse signal VGP1, the standby signal STBY, the current IL flowing through the primary coil 4, the signal RCMPEN, the signal FCMPEN, a voltage VL (=VL2−VL1) applied to the primary coil 4, the set signal VR2, the reset signal VF2, and the output signal DOUT When the input signal DIN rises to the H level at time t1, the input signal DINA instantly rises to the H level since the signal FCMPEN is at the L level. The edge detection circuit 10 turns the second pulse signal VGP2 to the L level for a predetermined width. At this time, since the standby signal STBY is at the L level (the first standby signal VGN1 is at the H level), the transistors 23 and 22 turn on and a voltage VL equal to the power supply voltage VDD1 is applied to the primary coil 4. As a result, the positive current IL starts to flow through the primary coil 4 with a constant increasing rate.

When the second pulse signal VGP2 returns to the H level at time t2, the transistor 23 turns off so that the current IL flows back through the transistor 22 and reflux diode 26. At this time, a voltage VL equal to −Vf (Vf: forward-direction voltage of the diode) is applied to the primary coil 4. The current IL gradually decreases and returns to zero at time t3. The decreasing rate (absolute value) is smaller than the above increasing rate. The standby signal STBY rises to the H level (the second standby signal VGN2 rises to the H level) at time t3.

During this time, a voltage is generated in the secondary coil 5 in accordance with the voltage VL in the primary coil 4. Since the voltage VR generated on the secondary side during the period in which the current IL increases (from t1 to t2) is higher than the reference voltage Vref, the set signal VR2 is generated and the output signal DOUT rises to the H level. On the other hand, since the voltage VF (noise voltage) generated on the secondary side during the period in which the current IL decreases (from t2 to t3) is lower than the reference voltage Vref, the reset signal VF2 is not generated and the output signal DOUT remains at the H level.

When the input signal DIN falls to the L level at time t4, the input signal DINA instantly falls to the L level since the signal RCMPEN is at the L level. The edge detection circuit 9 turns the first pulse signal VGP1 to the L level for a predetermined width. At this time, since the standby signal STBY is at the H level (the second standby signal VGN2 is at the H level), the transistors 21 and 24 turn on and a voltage VL equal to a voltage −VDD1 is applied to the primary coil 4. As a result, a negative current IL starts to flow through the primary coil 4 with a constant increasing rate.

When the first pulse signal VGP1 returns to the H level at time t5, the transistor 21 turns off so that the current IL flows back through the transistor 24 and reflux diode 25. At this time, a voltage VL equal to Vf is applied to the primary coil 4. The current IL (absolute value) gradually decreases and returns to zero at time t6. The decreasing rate (absolute value) is smaller than the above increasing rate. The standby signal STBY falls to the L level (the first standby signal VGN1 rises to the H level) at time t6.

Since the voltage VF generated on the secondary side during the period in which the current IL increases (from t4 to t5) is higher than the reference voltage Vref, the reset signal VF2 is generated and the output signal DOUT falls to the L level. On the other hand, since the voltage VR generated on the secondary side during the period in which the current IL decreases (from t5 to t6) is lower than the reference voltage Vref, the set signal VR2 is not generated and the output signal DOUT remains at the L level.

The operation from time t1 to time t6 is performed when the edge-to-edge spacing of the input signal DIN is sufficiently long. On the other hand, in the operation from time t7 to time t11, the input signal DIN, after rising at time t7, falls at time t8 prior to the time point when the current IL returns to zero. When the input signal DIN rises, the signal RCMPEN rises to the H level, and remains at the H level, until time t9 at which the detected current increased in the positive direction returns to zero.

When the signal RCMPEN is kept at the H level while the signal FCMPEN is at the L level, as can be seen from the truth table shown in FIG. 4, the input signal DINA is kept at the H level even when the input signal DIN falls to the L level. In other words, the falling of the input signal DINA is delayed until time t9 at which the current IL increased in the positive direction returns to zero. When the current IL turns to zero at time t9, the standby signal STBY rises to the H level and the signal RCMPEN falls to the L level, so that the input signal DINA falls to the L level. The operation from time t9 to time t11 is the same as the operation from time t4 to time t6.

In the operation from time t15 to time t19, the input signal DIN falls at time t15 and rises at time t16 which is before the time point at which the current IL returns to zero. When the input signal DIN falls, the signal FCMPEN rises to the H level, and remains at the H level until time t17 at which the detected current increased in the negative direction returns to zero.

When the signal FCMPEN is kept at the H level while the signal RCMPEN is at the L level, the input signal DINA is kept at the L level even when the input signal DIN rises to the H level. In other words, the rising of the input signal DINA is delayed until time t17 at which the current IL increased in the negative direction returns to zero. When the current IL returns to zero at time t17, the standby signal STBY falls to the L level and the signal FCMPEN falls to the L level, so that the input signal DINA rises to the H level. The operation from time t17 to time t19 is the same as the operation from time t1 to time t3.

Figure 7:
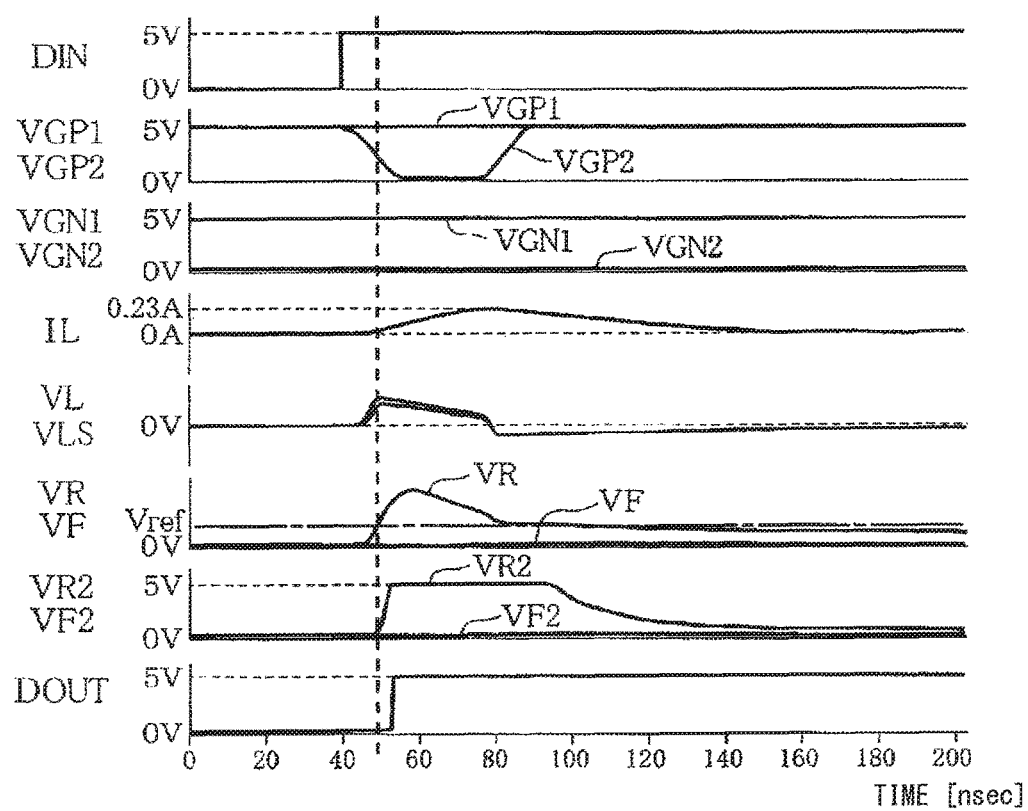
FIG. 7 is a simulated waveform chart of an input signal DIN at rising.
Figure 8:
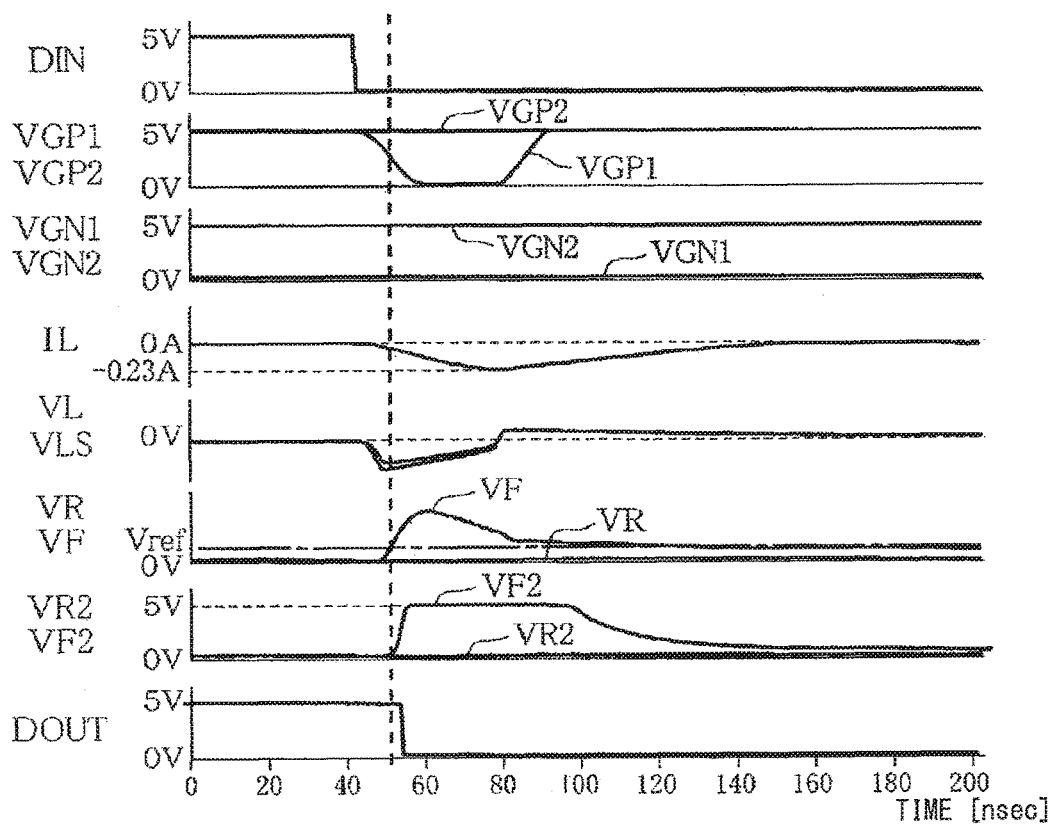
FIG. 8 is a simulated waveform chart of the input signal DIN at falling.

FIG. 7 to FIG. 11B are simulated waveform charts of the insulation communication device 1. FIG. 7 shows a waveform of the input signal DIN at the rising, and FIG. 8 shows a waveform of the input signal DIN at the falling. In the drawings, VLS represents a voltage induced in the secondary coil 5. The vertical broken line indicates a time point at which the voltage VR or VF in the reception circuit 3 equals to the reference voltage Vref. It can be seen that the input signal DIN is correctly transferred to the output signal DOUT with an extremely small delay.

Figure 9:
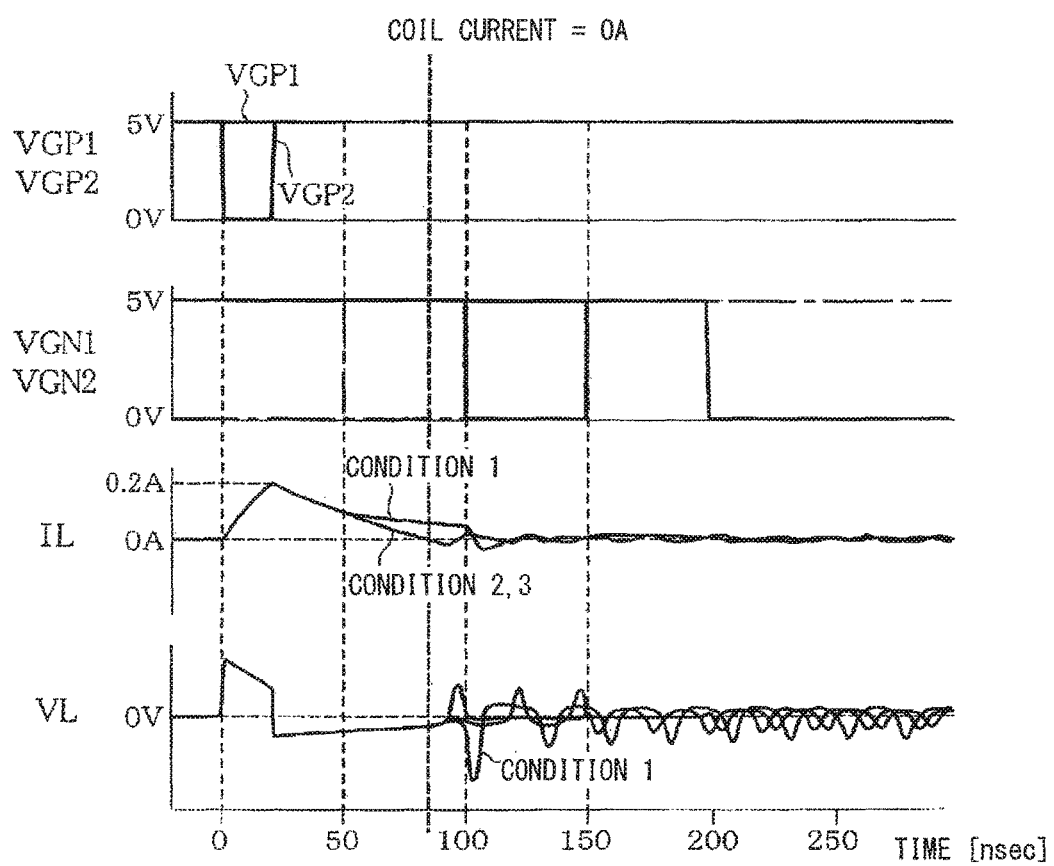
FIG. 9 is a simulated waveform chart of a standby signal STBY with three patterns of change timing.

FIG. 9 is a waveform chart where, after the rising of the input signal DIN at to, the timing of falling the first standby signal VGN1 to the L level and rising the second standby signal VGN2 to the H level is changed in three different patterns. In the simulation associated with FIG. 9, there is provided a period of 50 nsec in which both the first standby signal VGN1 and the second standby signal VGN2 fall to the L level.

In Condition 1, the first standby signal VGN1 falls to the L level at 50 nsec and the second standby signal VGN2 rises to the H level at 100 nsec. In Condition 2, the first standby signal VGN1 falls to the L level at 100 nsec and the second standby signal VGN2 rises to the H level at 150 nsec. In Condition 3, the first standby signal VGN1 falls to the L level at 150 nsec and the second standby signal VGN2 rises to the H level at 200 nsec. The two-dot-chain line drawn around 85 nsec indicates a time point at which the current IL decreases after having increased in the positive direction and then reaches zero, assuming that the first standby signal VGN1 is kept at the H level.

In Condition 1, since the first standby signal VGN1 falls to the L level to cut the current path before the current IL returns to zero, a large negative surge voltage is generated in the primary coil 4 (around 105 nsec). In other words, if the transistor 22 or 24 is turned off when the current flowing through the primary coil 4 is decreasing, an oscillatory noise voltage is generated in the secondary coil 5 due to the switching timing being too early, because of which the output signal DOUT may not be generated correctly.

In Condition 2 and Condition 3, since the first standby signal VGN1 falls to the L level to cut the current path after the current IL has returned to zero, the noise voltage generated in the primary coil 4 and eventually in the secondary coil 5 is small. In Condition 3, however, the timing at which the first standby signal VGN1 falls to the L level (timing for rising the standby signal STBY to the H level) is delayed as compared to Condition 2.

As a result, when the frequency of the input signal DIN is increased and the edge spacing is reduced in a steady state, errors can easily occur. In the standby signal control circuit 11 of this embodiment, the standby signal STBY is inverted instantly when the current IL returns to zero. This is the most preferable timing for switching the standby signals VGN1 and VGN2 irrespective of the inductance value of the primary coil 4.

Figure 10A:
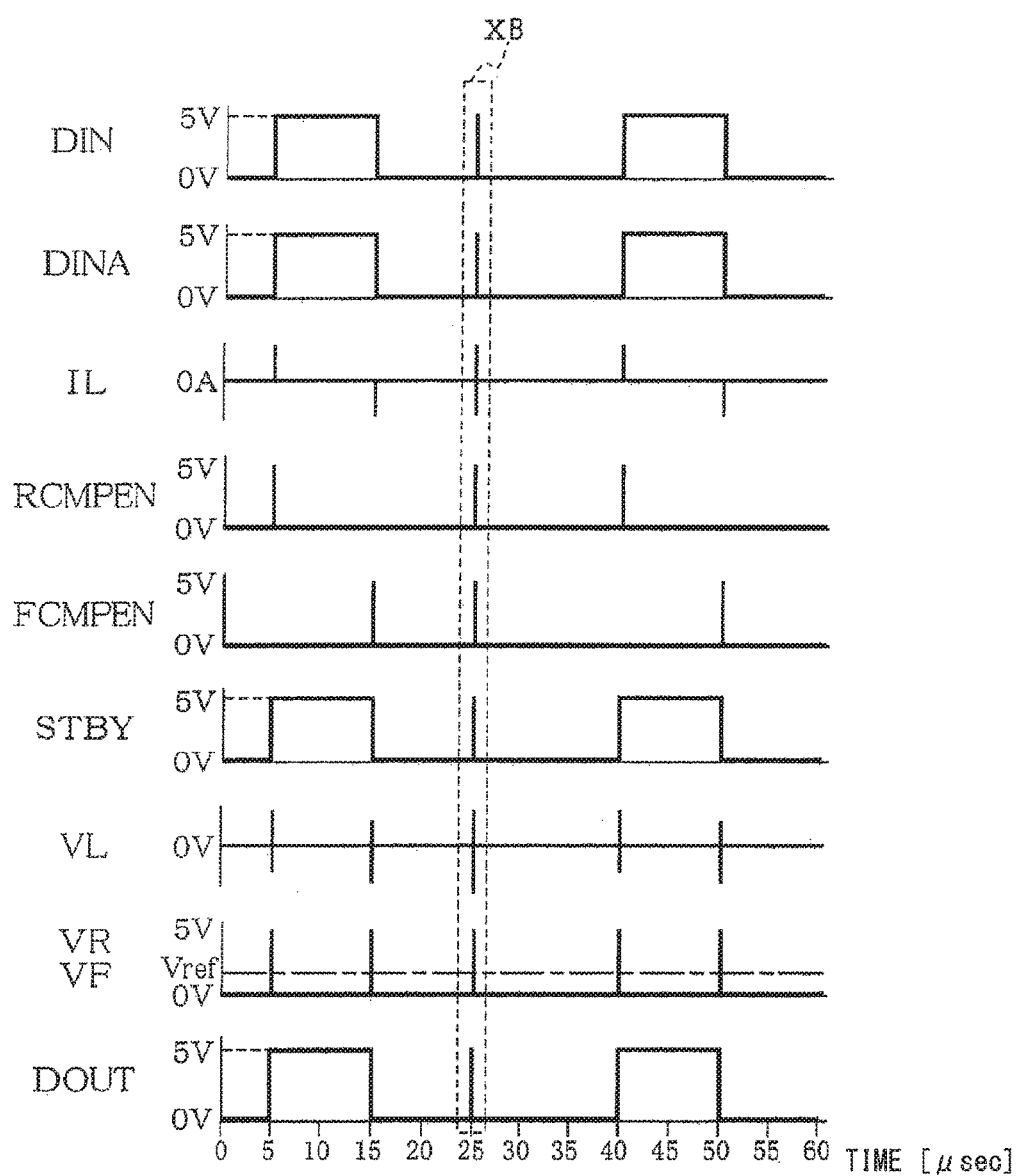
FIG. 10A is a simulated waveform chart of the input signal DIN when the duty ratio is lowered.
Figure 10B:
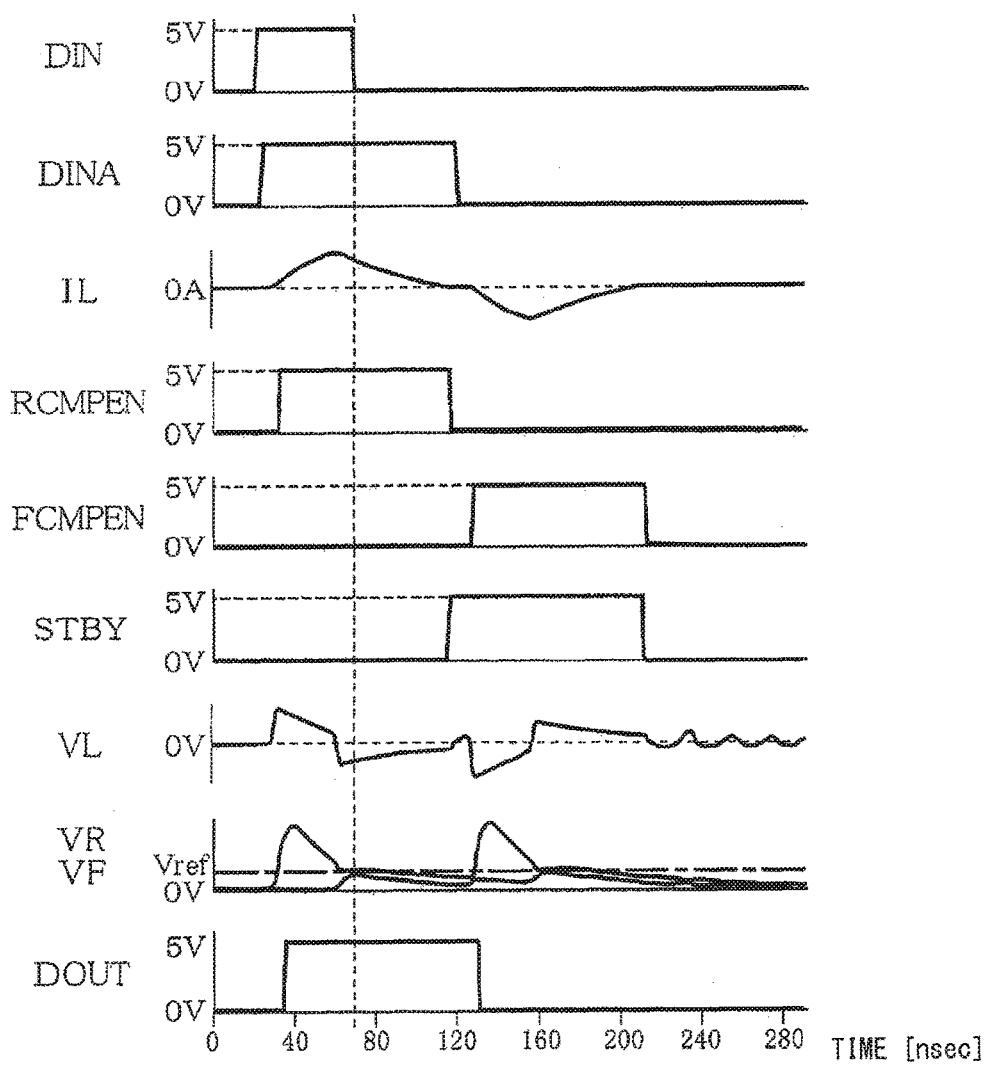
FIG. 10B is an enlarged view of a part encircled by a broken line XB in the waveform chart of FIG. 10A.

FIG. 10A is a waveform chart of the input signal DIN when the duty ratio is reduced temporarily so that a pulse of a very short H-level period (50 nsec) is generated. FIG. 10B is an enlarged view of a part encircled by a broken line XB in the waveform chart of FIG. 10A. It can be seen that, once the input signal has risen, the falling of the input signal DINA is delayed until the time point at which the current IL increased in the positive direction returns to zero. As a result, while the width of the pulse output from the output signal DOUT is broadened to 100 nsec, no error such as an erroneous edge transfer has occurred.

Figure 11A:
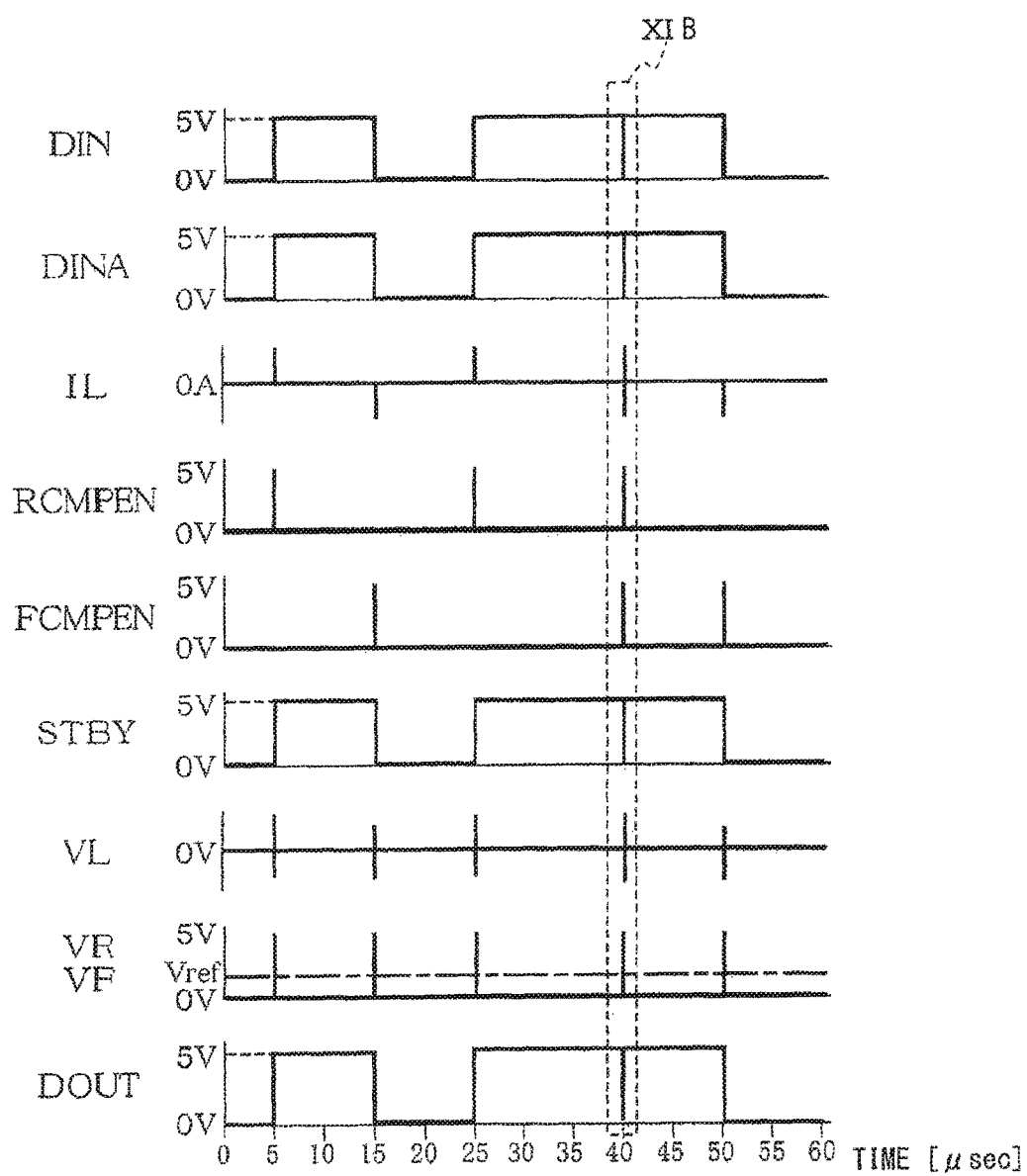
FIG. 11A is a simulated waveform chart of the input signal DIN when the duty ratio is increased.
Figure 11B:
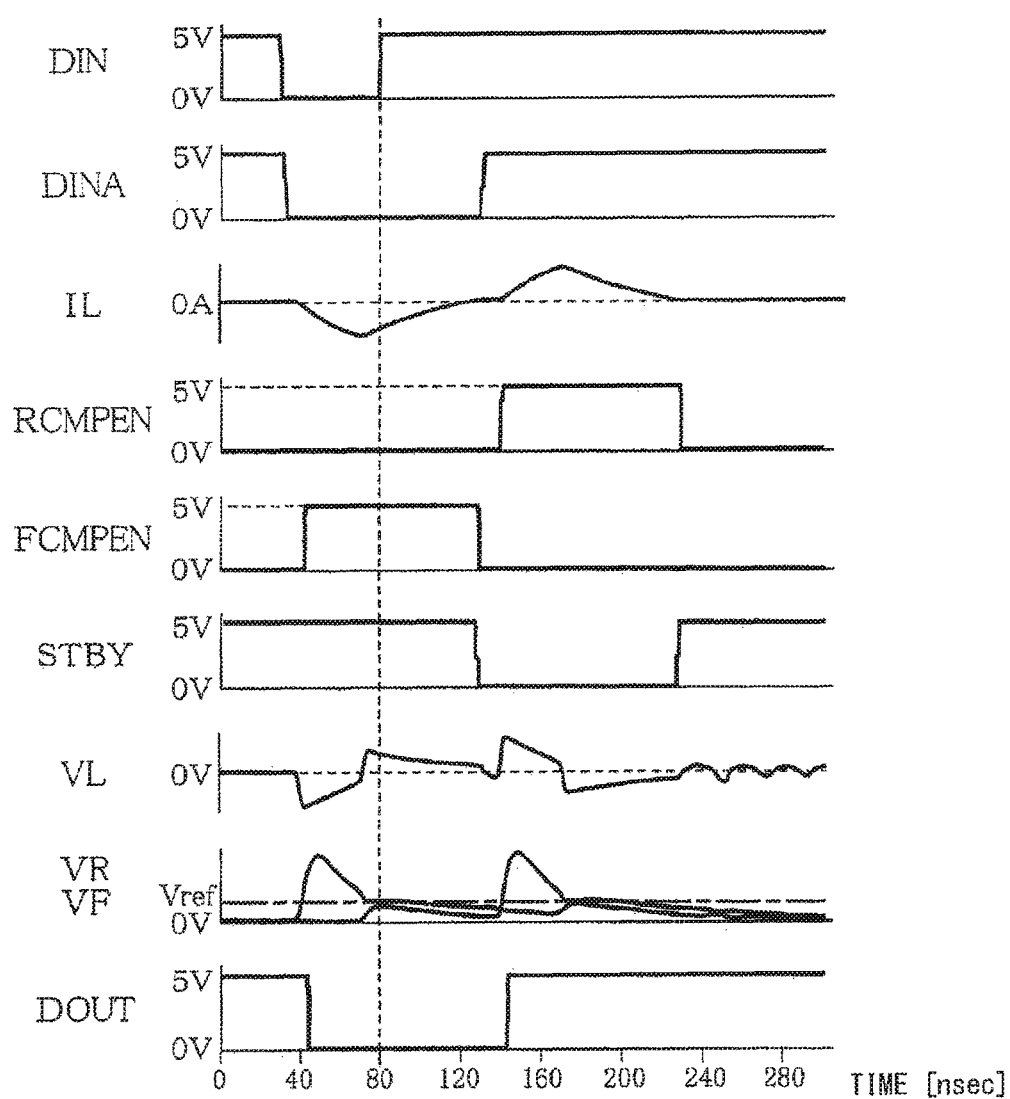
FIG. 11B is an enlarged view of a part encircled by a broken line XIB in the waveform chart of FIG. 11A.

FIG. 11A is a waveform chart of the input signal DIN when the duty ratio is increased temporarily so that a pulse of a very short L-level period (50 nsec) is generated. FIG. 11B is an enlarged view of a part encircled by a broken line XIB in the waveform chart of FIG. 11A. It can be seen that, once the input signal DIN has fallen, the rising of the input signal DINA is delayed until the time point at which the current IL increased in the negative direction returns to zero. As a result, although the width of the pulse output from the output signal DOUT is broadened to 100 nsec, no error such as an erroneous edge transfer has occurred.

In the insulation communication device 1 of this embodiment, the direction of the current flowing through the primary coil 4 upon detection of a falling edge of the input signal DIN is reversed upon detection of a rising edge, so that signal transfer from the transmission circuit 2 to the reception circuit 3 is possible with the use of a pair of coils 4 and 5. The circuit scale is made smaller than a configuration that uses two or more pairs of coils.

In the standby signal control circuit 11 of this embodiment, after the edge detection circuit 9 or 10 has output a pulse signal in accordance with the detection of an edge of the input signal DIN, the standby signal STBY is switched in a minimum time while an oscillatory noise that can be generated on the secondary side is minimized. Thus, errors in the output signal DOUT caused by oscillatory noise and arm short-circuiting in the bridge circuit 6 can be prevented. In the pulse signal control circuit 8, even when short pulses appear in the input signal DIN, the interval of pulse signals VGP1 and VGP2 is broadened appropriately, so that arm short-circuiting in the bridge circuit 6 is prevented and the input signal DIN is correctly transferred.

The transistors 22 and 24 in the lower arm of the bridge circuit 6 that applies power to the primary coil 4 respectively include the reflux diodes 25 and 26. After the current is increased by applying the power supply voltage VDD1 to the primary coil 4, the current IL is decreased through the reflux diode 26. With this configuration, the decreasing rate of the current IL (absolute value) is smaller than the increasing rate of the current (absolute value), so that a noise voltage induced in the secondary coil 5 can be reduced, and errors in the output signal DOUT can be prevented more reliably.

While preferred embodiments of the present disclosure have been described above, the present disclosure is not limited to the embodiments described above, and various modifications and extensions are possible without departing from the scope of the invention.

The pulse signal control circuit 8 may output a signal DINA, which maintains the level of the input signal DIN for a period of time in which a detected current returns to zero after having at east increased in a negative direction or a positive direction at the falling or rising of the input signal DIN.

The output signal generation circuit 16 may include comparators 58 and 59 as required. The reflux diodes 25 and 26 may or may not be connected as required, since a parasite diode is formed in the MOS transistors 22 and 24.

The invention claimed is:

1. An insulation communication device comprising:
a transmission circuit including a primary coil; and
a reception circuit including a secondary coil, and
the insulation communication device configured to transmit a signal from the transmission circuit to the reception circuit by magnetic coupling between the primary coil and the secondary coil,
wherein the transmission circuit includes:
an edge detection circuit that generates a first pulse signal when detecting a falling edge of an input signal and generates a second pulse signal when detecting a rising edge of the input signal;
a bridge circuit that includes
a first arm in which a first main switch driven to turn on based on the first pulse signal and a first standby switch driven to turn on based on a first standby signal are connected in series via a first output terminal, and
a second arm in which a second main switch driven to turn on based on the second pulse signal and a second standby switch driven to turn on based on a second standby signal are connected in series via a second output terminal,
the bridge circuit connected to the primary coil, which is arranged between the first output terminal and the second output terminal;
a coil current information detection circuit that detects a current flowing through the primary coil;
a standby signal control circuit that switches the first standby signal to an on state in place of the second standby signal when an increased current detected by the coil current information detection circuit returns to zero after the edge detection circuit outputs the first pulse signal, and switches the second standby signal to an on state in place of the first standby signal when the increased current detected by the coil current information detection circuit returns to zero after the edge detection circuit outputs the second pulse signal; and
a pulse signal control circuit that restricts the edge detection circuit from generating the second pulse signal during a time period until the increased current detected by the coil current information detection circuit returns to zero after the edge detection circuit outputs the first pulse signal, and restricts the edge detection circuit from generating the first pulse signal during a time period until the increased current detected by the coil current information detection circuit returns to zero after the edge detection circuit outputs the second pulse signal, and
wherein the reception circuit includes:
a first detection circuit that detects a positive voltage generated in the secondary coil;
a second detection circuit that detects a negative voltage generated in the secondary coil; and
an output signal generation circuit that shifts the output voltage to a first level based on the detected positive voltage, and shifts the output voltage to a second level based on the detected negative voltage.

2. The insulation communication device according to claim 1,
wherein the pulse signal control circuit maintains a level of the input signal for a time period until at least one of the increased currents respectively detected at falling and rising of the input signal returns to zero.

3. The insulation communication device according to claim 1,
wherein a reflux diode is connected in parallel to each of the first standby switch and the second standby switch.

4. The insulation communication device according to claim 1,
wherein the output signal generation circuit shifts the output signal to the first level when the detected positive voltage is higher than a reference voltage, and shifts the output signal to the second level when the detected negative voltage is higher than the reference voltage.

* * * * *